Jan. 21, 1947.  J. W. RIEKE  2,414,486
SWEEP CONTROL CIRCUITS
Filed Nov. 30, 1943  2 Sheets-Sheet 1
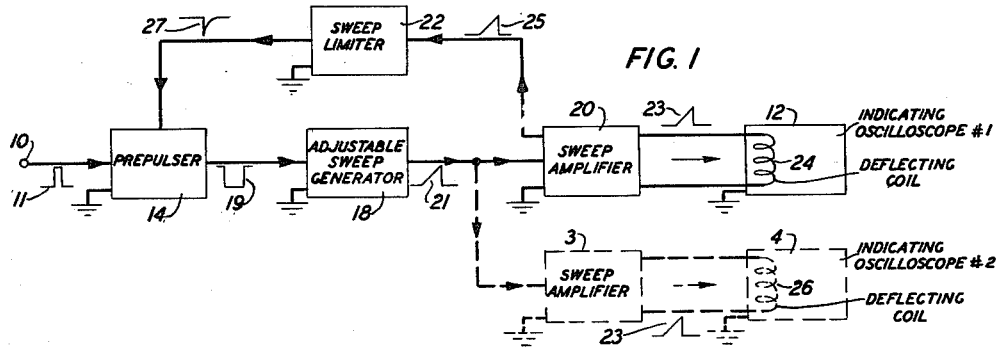
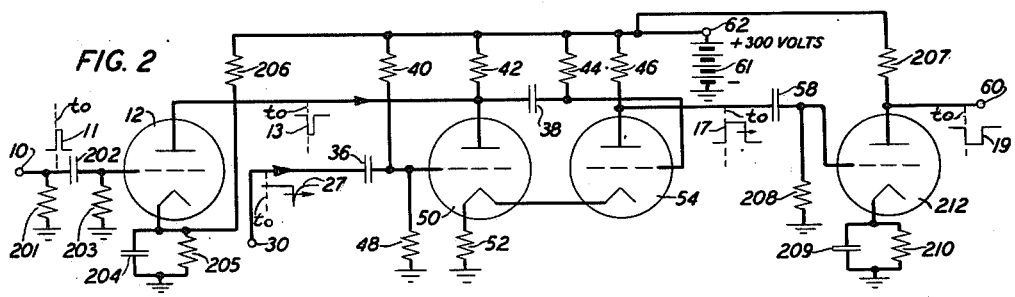
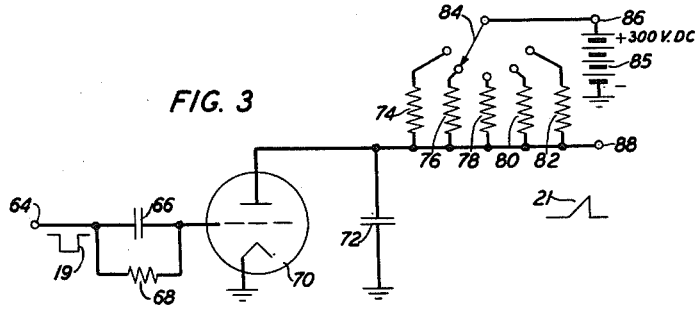
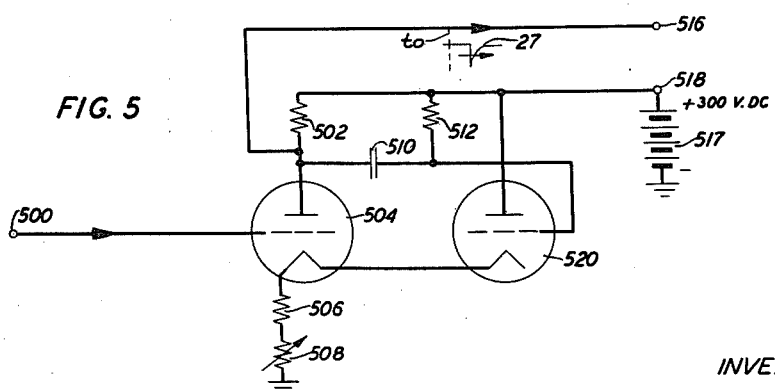
INVENTOR
J. W. RIEKE
BY
ATTORNEY Jan. 21, 1947.  J. W. RIEKE  2,414,486

SWEEP CONTROL CIRCUITS

Filed Nov. 30, 1943  2 Sheets-Sheet 2

INVENTOR
J. W. RIEKE
BY
ATTORNEY

Patented Jan. 21, 1947

2,414,486

UNITED STATES PATENT OFFICE 2,414,486

SWEEP CONTROL CIRCUITS

John W. Rieke, New York, N. Y., assignor to Bell Telephone Laboratories, Incorporated, New York, N. Y., a corporation of New York Application November 30, 1943, Serial No. 512,295

7 Claims. (Cl. 250—27)

This invention relates to wave reflection, object detecting and ranging systems. More particularly it relates to improved arrangements facilitating the adjustment of range sweep circuits and to associated units for use in such circuits.

Since the accuracy of ranging systems is, to an extent, dependent upon distance, measurements at the extreme range of a system are of use principally for look-out or searching operations and the indications of range provided need be, of course, of no greater precision than that which is warranted by the accuracy of the range measurements.

As the range decreases, however, the range measurements become more accurate and the precision with which the indications can be made should be correspondingly increased.

The indicators employed in ranging systems are usually, in essence, timing devices and an element of the indicator is caused to traverse a predetermined path at a predetermined rate, the motion of this element being synchronized with the emission of exploratory wave energy by the system, and some characteristic of the element or its motion is modified by received reflections of the exploratory wave energy, the distance to a particular reflecting object being, obviously, a function of the time required for the exploratory energy to travel from the system to the object and back (by reflection or reradiation) to the system.

A common type of indicator is, of course, the cathode-ray oscilloscope, the ray thereof constituting the movable element above mentioned, and its intensity can be momentarily increased or it can be momentarily deflected from its normal sweep path by a received reflection of the exploratory wave energy to indicate the instant at which the reflection is received. As the range to be portrayed upon the screen of the indicator is decreased the rate at which the ray is caused to traverse its normal path on the screen of the indicator can be increased, the effect, of course, being to "expand" the time or distance scale, i. e., to increase the spacing between consecutive scale marks corresponding to a particular number of units of distance such as feet, yards, etc., which can be associated with the screen of the indicator. This of course facilitates a more accurate reading of the range.

In the determination of the effective range to be portrayed by the range indicator of a reflection type object detecting and ranging system, it is necessary (assuming an electrically operated indicating device such as a cathode ray oscilloscope, or the equivalent, is to be employed) to provide an electrical quantity varying in accordance with a definite law, preferably linearly, with time during a predetermined time interval and between predetermined minimum and maximum values, in synchronism with the emission of exploratory energy by the system, i. e., in the simplest case the quantity should start from a predetermined value at the instant exploratory energy is emitted by the system and should preferably vary linearly throughout the time interval required for the energy to travel to a reflecting object at the maximum range to be measured and be reflected back to the observation point. At the end of this interval the quantity should have just reached a particular predetermined maximum value and should then be restored to its initial value in time to repeat the variation cycle with the next successive emission of exploratory energy by the system.

For any discrete time interval, a linearly varying electrical quantity starting at a predetermined value and reaching a second predetermined value precisely at the termination of the interval may be obtained by the use of a properly proportioned resistance capacity circuit. Numerous means for starting and stopping the charging (or discharging) of such a circuit and restoring it to its initial condition in time to repeat the cyclic variation with the next successive emission of exploratory energy, are well known in the art. Such arrangements of the prior art, however, require that, to change the time interval and to retain linear variation of the electrical quantity between the same initial and final values for the new time interval, at least two controls must be manipulated, one to change the "slope" of the resistance capacity circuit and the second to change the timing of the stopping and restoring means employed.

This invention is therefore directed to circuit arrangements in which the simple adjustment of the slope of a timing circuit is alone required to provide linearly varying range sweep voltages or currents which will start and stop at predetermined values in substantially any time interval desired within a wide range of time intervals, the circuit arrangements automatically restoring the timing circuit for repetition of the cycle at the end of each timing interval.

The principal object of this invention is accordingly the provision of improved adjustable range sweep or timing circuits for energy wave reflection object-detecting and ranging systems.

Another object is the provision of improved apparatus units for use in range sweep circuits of the above-described character and in similar circuits.

In accordance with this invention, therefore, illustrative circuit arrangements will be described in detail hereinafter which respond to a short, definitely timed, control pulse to initiate the charging of the condenser of a resistance capacity circuit and which, when the charge on the condenser has reached a predetermined value, provide for automatically stopping the charging action and restoring the resistance capacity circuit and the associated circuits to their initial states in readiness to repeat the cycle upon receipt of the next control pulse. The control pulses are for the illustrative case, of course, assumed to be derived from the circuit which controls the emission of exploratory energy by the system with which the sweep circuit is to be employed. The duration of the charging interval in such arrangements can obviously be readily adjusted over a wide range of values by simply changing either the resistance or the capacity (or both) of the resistance capacity timing circuit.

Further objects will become apparent during the course of the following description. The principles of the invention will be more readily understood from the detailed description of illustrative embodiments thereof, hereinunder, taken in conjunction with the appended drawings in which, Fig. 1 represents in schematic block-diagram form an adjustable range sweep circuit of the invention;

Fig. 2 shows in electrical schematic diagram form a prepulser circuit suitable for use in the circuit of Fig. 1;

Fig. 3 shows in electrical schematic diagram form an adjustable sweep generator circuit suitable for use in the circuit of Fig. 1;

Fig. 5 shows in electrical schematic diagram form a sweep limiter suitable for use in the circuit of Fig. 1;

Figure 4:
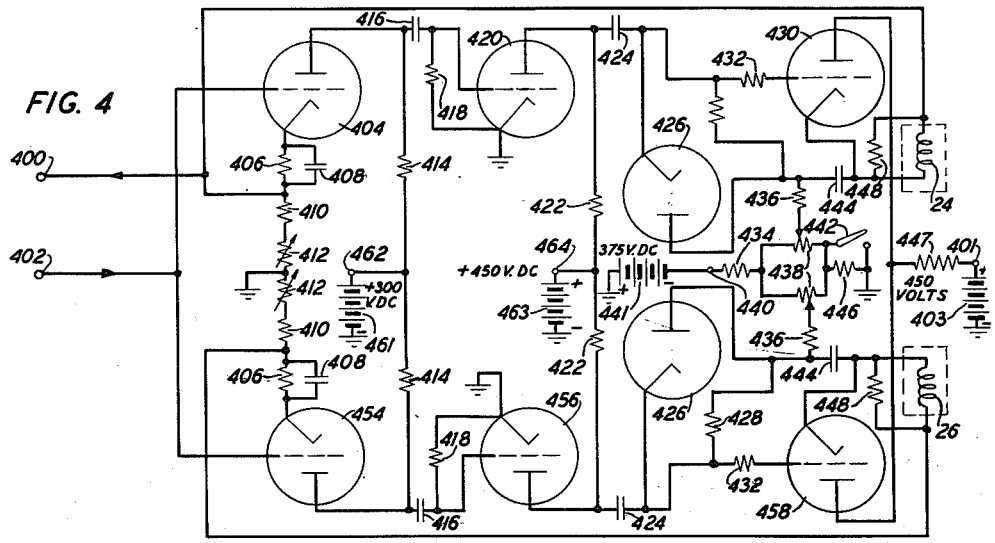
Fig. 4 shows in electrical schematic diagram form sweep amplifiers suitable for use in the circuit of Fig. 1.

In more detail in Fig. 1, a circuit arrangement illustrative of the invention is shown, in block schematic diagram form, which comprises prepulser 14, adjustable sweep generator 18, sweep amplifier 20, and sweep limiter 22 interconnected as shown to provide appropriate range sweep currents to deflecting coils 24, 26 of two cathode-ray oscilloscope indicators. In the absence of an input pulse the circuit arrangement of Fig. 1 remains quiescent and furnishes no deflecting currents to deflecting coils 24, 26 as will become apparent hereinunder. However, when a short positive electrical pulse 11 such as, for example, may be derived from the modulator circuit controlling the emission of an energy wave pulse from a wave reflection object detecting and ranging system, is supplied to terminal 10 the circuit abandons its quiescent or "standby" state and completes the following cycle of operations.

Prepulser 14 initiates a pulse 19 in the output thereof, the duration of which is determined, as will presently appear, by the cooperative action of several other of the units of the circuit of Fig. 1. To avoid possible confusion, it is here pointed out that the termination of all signals provided from unit to unit of the circuit of Fig. 1 is controlled by the cooperative action of several units as will become evident hereinafter. A schematic circuit for a preferred form of prepulser 14 is shown in Fig. 2 and will be described in detail hereinunder.

The adjustable sweep generator 18 responds to pulse 19 by initiating the generation of a saw-tooth sweep wave the slope of which is determined by suitably proportioning the resistance and capacity of a resistance capacity circuit. A preferred form of adjustable slope sweep generator 18 is indicated in schematic circuit form in Fig. 3 and will be described in detail below in connection therewith.

A saw-tooth sweep voltage wave of the type illustrated by pulse 21 is initiated by unit 18 and introduced into sweep amplifier 20. Amplifier 20 amplifies the input pulse 21 and furnishes an amplified pulse 23 of the same form to deflecting coil 24 of indicating oscilloscope 12. A pulse 25 is also furnished to sweep limiter 22 to provide for terminating the sweep wave as will be described hereinunder.

Since in many object-detection and ranging systems it is desirable to furnish two or more indicators, one to provide indications for the operator of the ranging equipment, a second for the pilot of the mobile craft upon which the equipment is carried and possibly others for gun control stations and the like, provision is made in the system of Fig. 1 for using a duplicate range indicator and comprises an additional sweep amplifier 3 and indicator 4, amplifier 3 having its input connected in parallel with that of amplifier 20. Amplifier 3 can preferably be identical with amplifier 20 except that it is not required to furnish a pulse to the sweep limiter. It operates to furnish a pulse 23 to deflecting coil 26 of indicating oscilloscope 4. In this particular system it is assumed also that the indicators employed are cathode-ray oscilloscopes in which the ray deflecting means comprise coils, i. e., the scopes are assumed to employ "magnetic deflection" of the ray.

Amplifiers 3 and 20 are, therefore, as will appear from the detailed description hereinunder, preferably of the form shown in Fig. 4 of the accompanying drawings.

A preferred form of the sweep limiter 22 is illustrated in Fig. 5 and will be described in detail hereinunder in connection with that figure. Sweep limiter 22 is biased to remain inoperative until the input signal wave reaches a predetermined amplitude at which instant it generates a sharp negative pulse 27 which is introduced into the prepulser 14 to restore it to its "standby" condition and cause the termination of the pulse 17 and all pulses which it initiated in the train of action throughout the system of Fig. 1 as described above, leaving the system in readiness to repeat the cycle of events described upon the arrival of the next pulse 11 from the energy emission control circuit of the object-detecting and ranging system with which the circuit of Fig. 1 is associated.

In Fig. 2 the electrical schematic diagram of a preferred form of prepulser 14 of Fig. 1 is shown. It comprises an input inverter which includes vacuum tube 12, resistors 201, 203, 205 and 206 and capacitances 202 and 204; a start-stop multivibrator circuit which includes the two triode vacuum tubes 50, 54 and interconnecting circuits including resistors 40, 42, 44, 46, 48 and 52, and capacitors 36 and 58; and an output inverter which includes vacuum tube 212, resistors 207, 208 and 210 and capacitance 209.

For operation, the positive terminal of a 300-volt direct current supply source 61 the negative terminal of which has been grounded, is connected to terminal 62. Terminal 10 connects, as above mentioned, to a source of control pulses 11, terminal 60 connects to the input of adjustable sweep generator 18 and terminal 30 connects to the sweep limiter 22 of Fig. 1.

In the absence of an input pulse 11 there is no output pulse 19 nor subsequent sweep limiting pulse 27 as was explained briefly in connection with Fig. 1. Prior to the arrival of an input pulse 11, the plate circuit of vacuum tube 54 is conducting because its grid is connected to the positive terminal of the 300-volt direct current supply through resistor 44. Current of sufficient amplitude thus is caused to flow through the cathode resistor 52 to raise the cathode potential toward that of the grid, causing the tube to operate near zero bias.

The plate circuit of vacuum tube 50 on the other hand is non-conducting because, although it has a positive bias represented by the voltage drop across resistor 48 resulting from current flowing from the 300-volt source 61 connected to terminal 62 through resistances 40 and 48 to ground, the negative bias provided by the voltage drop across resistor 52 resulting from the flow of plate current in tube 54, as above described, is somewhat greater.

The arrival of a positive pulse 11 through input terminal 10, however, results in a negative pulse 13 in the anode circuit of tube 12, which drives the grid of tube 54 negative, cutting off the above-mentioned flow of current through resistor 52. This removes the above-mentioned negative bias from the grid circuit of tube 50 causing this tube to become conducting. The resulting voltage drop in resistance 42 lowers the potential of the plate of tube 50 and passes a negative pulse to the grid of tube 54 which tends to hold the latter tube non-conducting.

The instant at which the leading edge (or beginning) of pulse 11 arrives is designated $t_0$ and the timing of other pulses with respect thereto is indicated in Figs. 2, 3 and 5 of the accompanying drawings.

As tube 50 becomes conducting, its plate cathode current passes through resistor 52 reestablishing a negative bias opposing the positive bias on the grid of tube 50. However, as a self-biased tube cannot cut itself off, the tube 50 will remain conducting until cut-off is effected by some other means.

The tube 54, however, will not remain indefinitely non-conducting because capacitor 38 having +300 volts on one side, via resistor 44, and a low positive potential on the other, will charge as fast as the time constant of capacitor 38 and resistor 44 will permit. This would eventually raise the grid of tube 54 to a point where the tube 54 would revert to its original conducting condition and would increase the voltage drop across resistor 52 sufficiently to cut off tube 50, thus restoring the circuit to its "standby" condition. The interval required for this to occur is made substantially longer (by proportioning elements 38 and 44 to have a suitably large time constant) than the longest normal interval between the instant of arrival of pulse 11 and the provision of a limiting pulse 27 by sweep limiter 22 as described above in connection with Fig. 1. In normal operation, therefore, the arrival of negative pulse 27 from sweep limiter 22 will cut off tube 50, driving its plate and the grid of tube 54 sufficiently positive to render tube 54 conducting, thereby restoring the circuit to its standby condition, completing the cycle and leaving the prepulser in readiness to repeat the operation upon the arrival of the next pulse 11. Capacitors 36 and 58 serve to isolate terminal 30 and the grid of vacuum tube 212, respectively from the 300-volt supply 61 which is connected to terminal 62 during operation of the circuit. The voltage of the anode of tube 54, is, of course, low when tube 54 is conducting because of the voltage drop in resistor 46, it rises substantially instantaneously to a considerably higher value (approaching +300 volts) when the tube 54 becomes non-conducting and returns substantially instantaneously to its initial low value when tube 54 becomes conducting again. This obviously results in the provision of a substantially square-topped positive pulse 17 to the grid circuit of tube 212, the leading edge (or beginning) of which occurs at the same instant $t_0$ as the leading edge of input pulse 11, and the trailing edge (or end) of which occurs at the instant at which the leading edge of pulse 27 from the sweep limiter 22 is received. Vacuum tubes 12 and 212 and associated resistors and capacitors are conventional inverter stages and serve principally to invert the control pulses which pass through them so that the output pulse 19 at terminal 60 is the negative counterpart of pulse 17.

The charge accumulated in condenser 209 during conducting intervals is sufficient to cut off the tube at the termination of the positive input pulse 17 and the time constant of condenser 209 and resistor 210 is sufficiently large to maintain tube 212 non-conducting until the arrival of the next successive pulse 17.

In Fig. 3, there is indicated in schematic circuit form a preferred type of the adjustable sweep generator 18 of Fig. 1. For operation terminal 60 of Fig. 2 is connected directly to input terminal 64 of the adjustable sweep generator of Fig. 3. This, of course, results in supplying the negative pulse 19 from prepulser 14 to the adjustable sweep generator 18.

From Fig. 2 it is apparent by inspection that terminal 60 is at a potential of substantially +300 volts prior to the arrival of pulse 17 and that for the duration of pulse 17 the potential of terminal 60 is substantially reduced by the flow of plate current through resistor 207. At the termination of pulse 17 terminal 60 returns to a potential of +300 volts until the next successive pulse 17 arrives.

This potential is, therefore, effective by connection to terminal 64 to render the grid of tube 70 positive, and therefore, the plate circuit of tube 70 is conducting and current flows from a +300-volt direct current supply source 85 connected to terminal 86 through one of the resistors 74, 76, 78, 80 or 82 as selected by switch 84, and the low impedance anode circuit of tube 70 to ground, the negative terminal of the supply source 85 being also grounded. The impedance of the anode circuit of tube 70 for this condition is small and therefore has the effect of draining off any substantial charge that may previously have accumulated in capacity 72.

Figure 7:
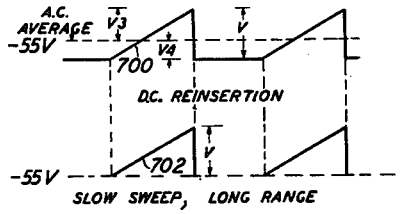

Upon the arrival of a positive pulse 17, tube 212 of Fig. 2 becomes conducting as above described. This, of course, removes the above-mentioned positive potential from the grid of tube 70 of Fig. 3 because of the voltage drop across resistor 207 resulting from the flow of anode circuit current of tube 212, and the accumulated charge in condenser 66 suffices to cut off tube 70, whereupon the effective short-circuit of the plate circuit of tube 70 is removed from capacity 72 and it proceeds to charge through the resistor selected by switch 84 (76 in the position illustrated in Fig. 3). The potential across condenser 72 will therefore rise exponentially as the charging process continues. The time constant is, of course, determined by the values of the selected resistor and the capacitor 72 and is made such that a substantially straight line portion of the exponential charging curve only will be employed. Any one of five different slopes may be selected, in the circuit shown, by selection of the proper one of the five resistors 74, 76, 78, 80 or 82 by switch 84. Illustrative charging curves for five sweep ranges are shown in Fig. 7.

At the termination of pulse 17, tube 212 of Fig. 2 is cut off, as described above, the potential of the anode of tube 212 rises abruptly carrying the grid of tube 70 of Fig. 3 with it, rendering tube 70 highly conductive and effectively short-circuiting and discharging capacity 72. At the output terminal 88 of the sweep generator 18 a saw-tooth shaped pulse 21 will therefore be obtained and this pulse may have any one of five different predetermined slopes by simply adjusting switch 84 to select the suitable one of the resistors 74, 76, 78, 80 and 82. All pulses start at substantially the same amplitude and are cut off by feedback action, as explained in connection with Fig. 1 and as will appear more fully hereinunder, when they reach a predetermined final amplitude.

In Fig. 4 a preferred type for the sweep amplifiers 3 and 20 of Fig. 1 is shown in schematic diagram form. As explained above, it is preferable to employ two substantially identical amplifiers. These provide, of course, identical sweep waves for two identical cathode-ray oscilloscopes the deflecting coils of which are represented by coils 24 and 26, respectively. The amplifier 20 of Fig. 1 comprises the tubes 404, 420, 426 (upper) and 430 with the associated circuits shown and the amplifier 3 of Fig. 1 comprises tubes 454, 456, 426 (lower) and 458 with the associated circuits shown. The inputs of both amplifiers are connected to terminal 402 to which saw-tooth pulse 21 is forwarded from adjustable sweep generator 18 of Fig. 1, one preferred form of which was described in detail above in connection with Fig. 3.

The sole distinction between these amplifiers is that a lead is taken to terminal 400 to actuate the sweep limiter 22 of Fig. 1 from the cathode circuit of the tube 404 of the upper amplifier, as shown. Each amplifier comprises a three-stage cathode-coupled feedback amplifier of which the first two stages are per se simple amplifiers and the final stage is in essence in the nature of a "cathode-follower."

In the first stage of each amplifier, a cathode level control potentiometer 412 is included. This potentiometer together with resistor 410, constitutes one of the two major impedances of the feedback circuit the other being the deflecting coil 24 or 26, and the shunting resistor 448. The inclusion of the deflecting coil in the feedback circuit of the amplifier insures that the corrective effects of feedback action will be based upon the actual current through the deflecting coil. Positioning the deflecting coil in the cathode circuit of the output stage (instead of in the anode circuit) substantially reduces the effect of the distributed capacity in the cable connecting the deflecting coil to the amplifier and makes practicable the use of much longer cables. In other words, it makes it readily possible to locate the indicators at positions more remote from the main radar apparatus than otherwise. Varying potentiometer 412 changes the gain of the amplifier and can hence be employed for auxiliary adjustments of the slope and amplitude of the sweep to the associated oscilloscope deflecting coil 24 or 26 without affecting the time of the sweep. For the upper amplifier, adjustment of potentiometer 412 also changes the amplitude of the control wave furnished to terminal 400 which, as mentioned above, connects to the sweep limiter 22 of Fig. 1, a preferred form of which is illustrated in Fig. 5, to be described presently. This amounts to using tube 404 as a cathode follower to supply limiter 22 in addition to its use as a stage of the amplifier.

The second stage of each amplifier, including tube 420 for the upper and tube 456 for the lower, has no cathode resistor and acts in a manner similar to that of a grid leak detector to produce a form of direct-current reinsertion in the following way. With respect to tube 420, coupling condenser 416 removes the direct current component of the wave so that the remaining alternating current component which is applied to the grid of tube 420 swings with equal areas above and below the average value or ground potential. When this grid goes positive, grid current is drawn through resistor 418 and produces a voltage drop that negatively biases the grid. The resistance-capacity product of resistor 418 and condenser 416 is such that condenser 416 will not discharge appreciably between the pulses. The self-biasing action of the tube 420 is for the purpose of having it operate in the most favorable part of its characteristic and minimizes the overloading which might otherwise occur in its anode circuit.

Between the second and the output stage of each amplifier, an "automatic centering" diode 426 is employed for the purpose of establishing at the beginning of each sweep a definite voltage on the grids of tubes 430 and 458 so that successive sweeps of the cathode-ray will start at the same point on the screen of the oscilloscope.

It is assumed, by way of example, that the over-all object detecting system with which the arrangements of the invention are to be used, is to provide an indication of the type known as a plan position indication. In this type of indication, the center point of the screen represents the point of observation at which the system is being used and indications representing objects about the observation point appear on the screen at angles with respect to the screen center point which correspond to the respective azimuth angles of the objects with respect to the observation point. The oscilloscope indications are placed at distances from the screen center point which are proportional to the distances of the corresponding objects, respectively, from the observation point. A common arrangement in such systems is to employ a highly directive beam antenna to receive the reflected waves from the objects to be detected, the antenna being rotated about a vertical axis and the deflecting coil of the oscilloscope being rotated about the axis of the cathode-ray tube in synchronism with the rotation of the antenna. A plan position indicating system of the type contemplated, except that a rotating electrostatic deflecting field is employed, is shown and described in the copending application of N. W. Bryant, Serial No. 423,757, filed December 20, 1941. For the indicator of such systems, the ray should return after each sweep to the center-point of the screen, except for a special case in which for short range operation the center-point is, in effect, expanded into a circle of appreciable diameter, as will be described in more detail hereinunder.

The normal function of diode 426 is then to insure that, for other than short range operation, the ray of the oscilloscope returns to the center of the screen after the completion of each sweep and remains there until the start of the next succeeding sweep. This is done by normally returning the sweep deflecting coil current of coils 24 and 26 to zero. This requires that the cathode current of tubes 430 and 458 be completely cut off between the end of each sweep and the next succeeding sweep. A bias of approximately −55 volts, from a source 441 of −375 volts direct current, connected to terminal 440 and through resistor 434, potentiometers 438 and resistor 446 to ground, the positive terminal of said source being also grounded, is connected to the grids of tubes 430 and 458 through resistors 432, 428 and 436. This biases the tubes to approximately 10 volts below cut-off and insures that the sweep trace will return to the center of the screen in the absence of an input pulse to terminal 402 of the amplifiers.

Expressed in other words the grids of tubes 430 and 458 are stabilized at a reference potential to ground of approximately −55 volts which is approximately 10 volts below cut-off during the off time of the range sweep. The method employed is a form of direct current reinsertion. Without the automatic centering diode circuits, the instantaneous grid potentials to cathode on vacuum tubes 430 and 458 would rise and fall about their average alternating current value as illustrated by the upper wave forms 600 and 700 in Figs. 6 and 7, Fig. 6 relating to a fast sweep (short range) pulse 600 and Fig. 7 relating to a slow sweep (long range) pulse 700.

Figure 6:
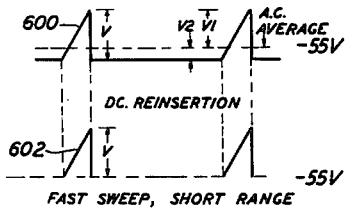
Figs. 6 and 7 illustrate by sweep wave diagrams a difficulty in connection with variable range sweep circuits, which will be explained hereinafter.

For the upper wave examples of Figs. 6 and 7 the maximum and minimum grid potentials would be $V_1$ and $V_2$, respectively, for the fast sweep, and $V_3$ and $V_4$, respectively, for the slow sweep, where $$V_1 + V_2 = V_3 + V_4 = V$$

With the automatic centering diode circuits, the instantaneous grid potentials on vacuum tubes 430 and 458 become −55 volts and −55 volts+$V$ for both fast and slow sweeps as shown in the lower wave forms of Figs. 6 and 7. Effectively, the alternating-current coupling path between vacuum tubes 420 and 430 and that between vacuum tubes 456 and 458 become direct current paths.

The output stages including tubes 430 and 458 are, as above mentioned, in the nature of cathode follower circuits, the cathode of each being returned to ground via the sweep coil 24 or 26, respectively, of its associated indicator and a portion of the cathode circuit impedance comprising resistor 410, and potentiometer 412 in the feedback circuit of the sweep amplifier with which it is associated as shown in Fig. 4. Thus the plate current of the output stage of each amplifier introduces a voltage drop in the cathode circuit of its first stage and this drop is of such polarity as to reduce the grid to cathode signal voltage of the first stage. This arrangement is, of course, a form of negative feedback and is effective to substantially improve the linearity of the amplifier characteristic.

The above-described amplifier circuit arrangement has an additional advantage in that at the start of a sweep the output tubes 430 and 458 are, as described above, operating at a point approximately 10 volts below cut-off. Consequently the first two stages of each amplifier are operating without negative feedback. The gain of these stages is therefore at its maximum value and the initial rise of potential on the output tubes 430 and 458 is very steep. The result of this is that substantially no sweep time is lost before output tubes 430 and 458 begin to conduct at the start of a sweep pulse. Thereafter, of course, the negative feedback becomes immediately effective and maintains the slope and linearity of the sweep as required for the particular range selected in the sweep generator 18 of Fig. 1.

The over-all arrangement of the sweep amplifiers of Fig. 4 described in detail above is unusually well adapted to amplify the required sweep wave with, for all practical purposes, no initial time delay in the sweep.

On the shortest sweep, which can, for example, correspond with a maximum range of only four miles, to avoid possible confusion which might result from a considerable number of indications appearing in close proximity to the center point of the screen of the cathode-ray oscilloscope, the center point can in effect be expanded into a small circle by simply closing switch 442 which short-circuits resistor 446. This lowers the negative bias on the output tubes 430 and 458 by approximately 35 volts so that the tubes operate at approximately 25 volts above cut-off and permit some current to flow in the sweep coils in the periods between sweep pulses. The result is that the sweeps return to a "zero distance" circle of approximately one mile equivalent radius with respect to the four mile range displayed on the screen instead of returning to the center point. This greatly facilitates the accurate determination of the azimuth angles of indications corresponding to objects within a mile or two of the observation point and reduces the tendency of adjacent indications to merge into each other. Potentiometers 438 provide means for adjusting the bias so that the expanded zero circle can be set exactly to a "one mile" radius, or to some other definite radius as may be desired, on the scale of the oscilloscope screen.

The amplifier of Fig. 4 requires for operation the following additional direct current voltage supply sources: Source 461 of +300 volts at terminal 462 and sources 441 and 403 each of +450 volts at terminals 464 and 601, respectively, the negative terminals of those sources being grounded. Resistors 414, 422 and 447 serve as coupling resistors to the supply sources as indicated in Fig. 4.

In Fig. 5 a preferred form of sweep limiter 22 of Fig. 1 is shown in simplified electrical schematic form. It comprises two vacuum tubes 504 and 520, fixed resistors 502, 512 and 506, potentiometer 508 and capacitor 510. Terminal 500 of this circuit is connected to terminal 400 of the circuit of Fig. 4, terminal 516 of this circuit is connected to terminal 30 of Fig. 2 and terminal 518 of this circuit is connected to a source 517 of +300 volts direct current, the negative terminal of the source being grounded.

The operation of the circuit of Fig. 5 is as follows: The input terminal 500 is connected to terminal 400 of the amplifier of Fig. 4, described in detail above. Prior to the arrival of a signal wave, tube 520 is conducting, since its grid is conducting, being connected through resistance 512 to the +300-volt supply 517, and tube 504 is nonconducting because of the negative bias caused by the flow of the plate current of tube 520 through the common cathode resistance comprising fixed resistor 506 and potentiometer 508. This latter bias is sufficient to raise the cathode of tube 520 to a potential near that of its associated grid so that tube 520 operates near zero bias.

The grid of tube 504 receives a small positive bias from the plate current drop in resistor 410 and potentiometer 412 associated with tube 404 of Fig. 4 described above, and a large negative bias from its own cathode resistors as described immediately above. The net effect of these biases is sufficiently negative to insure the cut-off of tube 504 in the absence of an input pulse.

With the arrival of an input pulse from the amplifier feedback circuit of Fig. 4, described above, the potential of the grid of tube 504 rises and finally overcomes its own negative cathode bias. The point on the saw-toothed wave at which the bias is overcome and the stage is triggered, depends, of course, upon the magnitude of the opposed negative and positive potentials above described, which are effective in the grid circuit of tube 504. This point is determined chiefly by the setting of potentiometer 508 and to a lesser extent by the setting of potentiometer 412 associated with tube 404 of Fig. 4. It is thus evident that the time at which tube 504 is triggered following the receipt of a signal wave is determined by the time required for the signal wave to rise to a particular positive value determined chiefly, as above described, by the setting of potentiometer 508 and to a lesser extent by the setting of potentiometer 412 (upper) of Fig. 4.

The triggering of tube 504 drives the grid of tube 520 in a negative direction through capacitor 510, because of the voltage drop in resistor 502 when tube 504 becomes conductive. Tube 520 remains cut off until the sweep returns to a lower value cutting off tube 504 once more and returning the circuit to the original condition in which it is ready for the next succeeding sweep to repeat the cycle just described. The net effect of this cycle of operations is to transmit a sharp negative pulse 27 to the prepulser of Fig. 2, terminal 516 being connected to terminal 30 of Fig. 2, and the pulse 27 operates to terminate the pulses 17 and 19 being provided by the circuit of Fig. 2 as described above in connection with that figure and resulting in the sweep quickly returning to zero.

Figure 8:
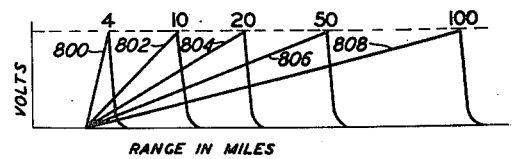
Fig. 8 illustrates a typical assortment of sweep wave forms which can be provided by a system of the invention such as is exemplified by Fig. 1.

As illustrated in Fig. 8, the system of the invention, as shown in the accompanying drawings and described in detail above, will provide linear sweeps 800, 802, 804, 806 and 808 for any one of five ranges as determined by the setting of switch 84 of Fig. 3, suitable ranges for a common form of object-detecting and ranging system being, for example, 4, 10, 20, 50 and 100 miles. Fig. 8 is, obviously, not drawn to scale.

From the above-detailed description of an illustrative system of the invention, it is apparent that the duration of pulses 17 and 19 provided by the circuit of Fig. 2 precisely determines for each range adjustment the active sweeping interval of the oscilloscopic indicator and it will therefore be apparent to those skilled in the art that either of these pulses is suitable for actuating an "unblanking circuit" (many suitable forms of which are well known in the art) to turn the ray of the oscilloscope on during the active sweeping interval only. This would, of course, result in prolonging the life of the oscilloscope and constitutes an inherent advantageous aspect of the arrangements of the invention.

It is to be understood that the above-described arrangements are simply illustrative of the application of the principles of the invention. Numerous other arrangements may be readily devised by those skilled in the art which will embody the principles of the invention and fall within the spirit and scope thereof. The scope of the invention is defined in the appended claims.

What is claimed is:

1. In an energy wave-reflection type ranging system, a sweep slope control circuit for a cathode-ray oscilloscope indicator which comprises a start-stop multivibrator circuit responsive to energy pulses from the transmitter of the system to start said multivibrator circuit, a sweep generating circuit including a vacuum tube having at least an anode, a control electrode and a cathode, and a resistance capacity timing circuit in the anode circuit of said tube said timing circuit having a variable resistor portion thereof said sweep circuit being cooperatively connected to said multivibrator circuit, an amplifier responsive to the potential established across the capacity of said resistance capacity circuit, and a circuit cooperatively coupling said amplifier to said multivibrator circuit, said last-mentioned coupling circuit including a biased limiting circuit and providing a stopping signal to said multivibrator circuit at the instant the potential supplied from said amplifier exceeds the limiting bias, whereby the effective slope of the sweep wave output of said amplifier can be adjusted to any value within a wide range of values by the sole adjustment of the variable resistor portion of said resistance capacity circuit without altering the limiting values of said sweep wave.

2. In a wave-reflection type object-detection and ranging system, a sweep control circuit comprising a first device for initiating a substantially squared-top pulse, a second device for initiating a saw-tooth shaped pulse in response to the receipt of said squared-top pulse from said first device, a third device responsive to the saw-toothed pulse initiated by said second device to generate a sharp terminating pulse at the instant said saw-toothed pulse reaches a predetermined amplitude, said third device being cooperatively connected to said first device to terminate by said sharp terminating pulse the square-top pulse initiated by said first device, whereby adjustment of slope of said saw-toothed pulse is alone required to provide any one of a plurality of saw-toothed sweep waves all of which will be terminated upon reaching said predetermined amplitude.

3. In an adjustable electrical control circuit for controlling the sweeping rate of an oscilloscopic indicating device, a first means responsive in its initial state to a first short electrical control pulse to initiate a longer electrical control pulse and responsive in the latter state to a second short electrical control pulse to terminate said longer control pulse and resume its initial state, a second means cooperatively connecting to said first means and responsive to said longer control pulse to initiate an electrical sweep wave of predetermined form and to terminate said sweep wave and restore to its initial state upon termination of said longer control pulse, and a third means cooperatively connecting with said second means and said first means and responsive to energy of said electrical sweep wave of said second means upon said sweep wave attaining a predetermined amplitude to provide said first means with a suitable short electrical pulse to cause said first means to terminate said longer control pulse and to resume its initial state.

4. In an adjustable electrical sweep control circuit for an oscilloscopic indicating device, the combination of a prepulser circuit, an adjustable sweep wave generating circuit, a sweep amplifying circuit and a sweep limiting circuit, said prepulser circuit being initially arranged to initiate a continuing pulse in response to a first substantially instantaneous pulse and to terminate said continuing pulse in response to a second substantially instantaneous pulse, said sweep wave generating circuit being connected to the output of said prepulser and being arranged to initiate and terminate the generation of a sweep wave having a predetermined law of variation in response to the leading and trailing edges of said continuing pulse from said prepulser, respectively, said sweep amplifying circuit being connected to said sweep wave generating circuit to amplify the output thereof, said sweep limiting circuit being connected to said amplifying circuit to derive energy of said amplified sweep wave therefrom and responsive to said energy when the same has reached a predetermined amplitude to generate a sharp pulse, the output of said pulser circuit connecting to said prepulser circuit whereby the sharp pulse thereof is made to terminate the said continuing electrical pulse being generated by said prepulser circuit and the entire circuit is restored to its initial state.

5. The combination of claim 4, said amplifying circuit including a negative feedback path which in turn includes the sweep deflecting coil of the oscilloscope the sweep of which is controlled by said circuit.

6. The combination of claim 4, said amplifying circuit including a plurality of stages, a negative feedback circuit connecting the output and input stages, and means for cutting off the output stage between successive sweep pulses whereby the full gain of the amplifying circuit is available at the start of each sweep without impairing the linearizing effect of the feedback action.

7. The combination of claim 4, said amplifying circuit providing direct current reinsertion whereby the sweep slope may be changed at will without substantially affecting the sweep limit potentials.

JOHN W. RIEKE.

Disclaimer 2,414,486.—*John W. Rieke*, New York, N. Y. SWEEP CONTROL CIRCUITS. Patent dated Jan. 21, 1947. Disclaimer filed Mar. 17, 1950, by the inventor; the assignee, *Bell Telephone Laboratories, Incorporated*, assenting.

Hereby enters this disclaimer to claims 1, 2, 3, and 4 of said patent.

[*Official Gazette April 18, 1950.*]